Aug. 28, 1962 H. BRANDT 3,051,256
POWER DRIVE FOR FOUR AXLE VEHICLE
Filed Aug. 6, 1959 3 Sheets-Sheet 1
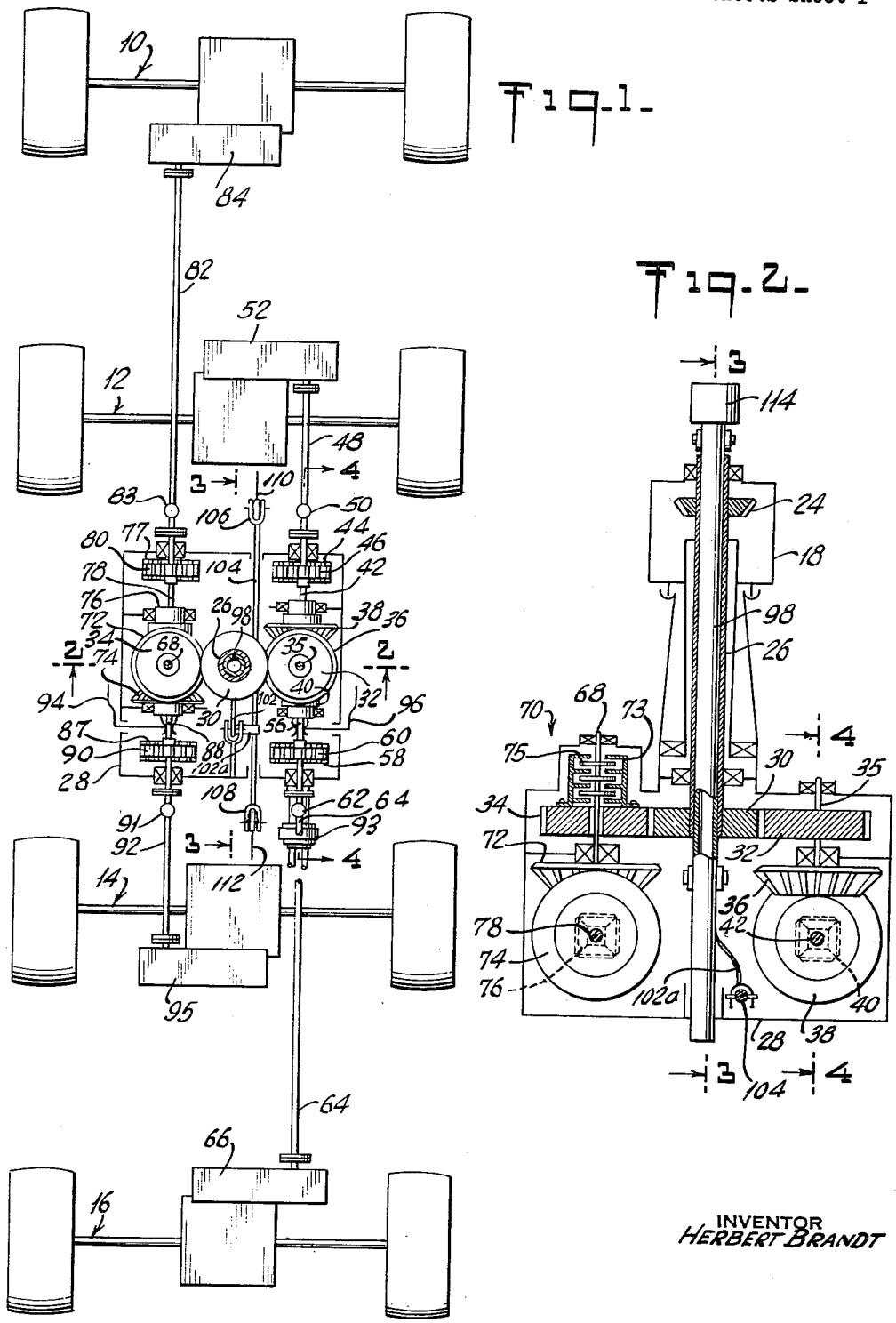
INVENTOR
HERBERT BRANDT Aug. 28, 1962    H. BRANDT    3,051,256
POWER DRIVE FOR FOUR AXLE VEHICLE
Filed Aug. 6, 1959    3 Sheets-Sheet 2
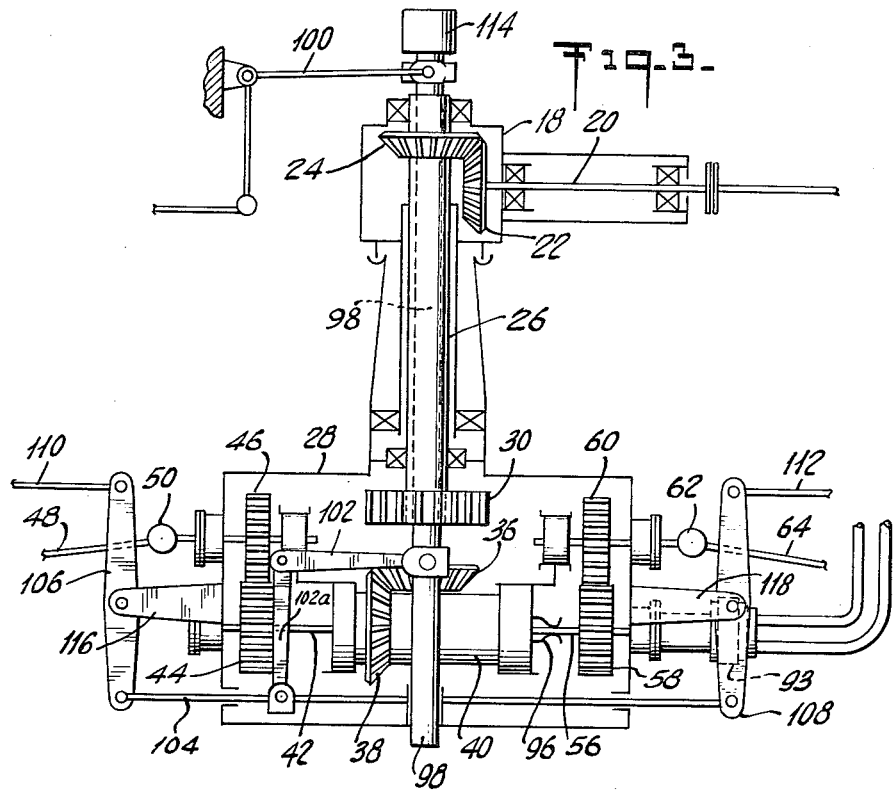
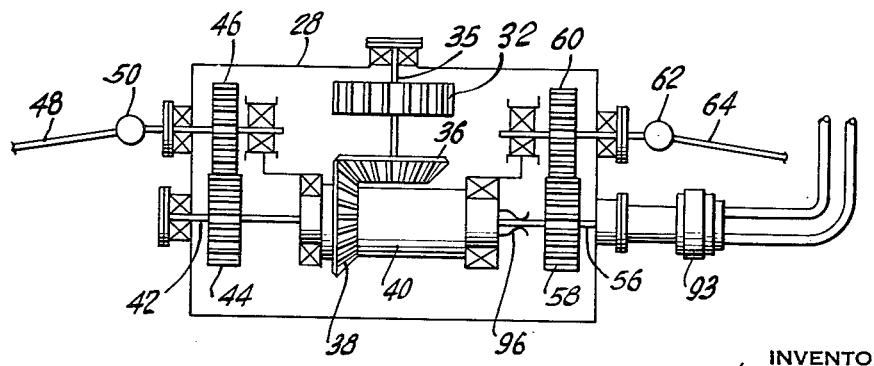
INVENTOR
HERBERT BRANDT

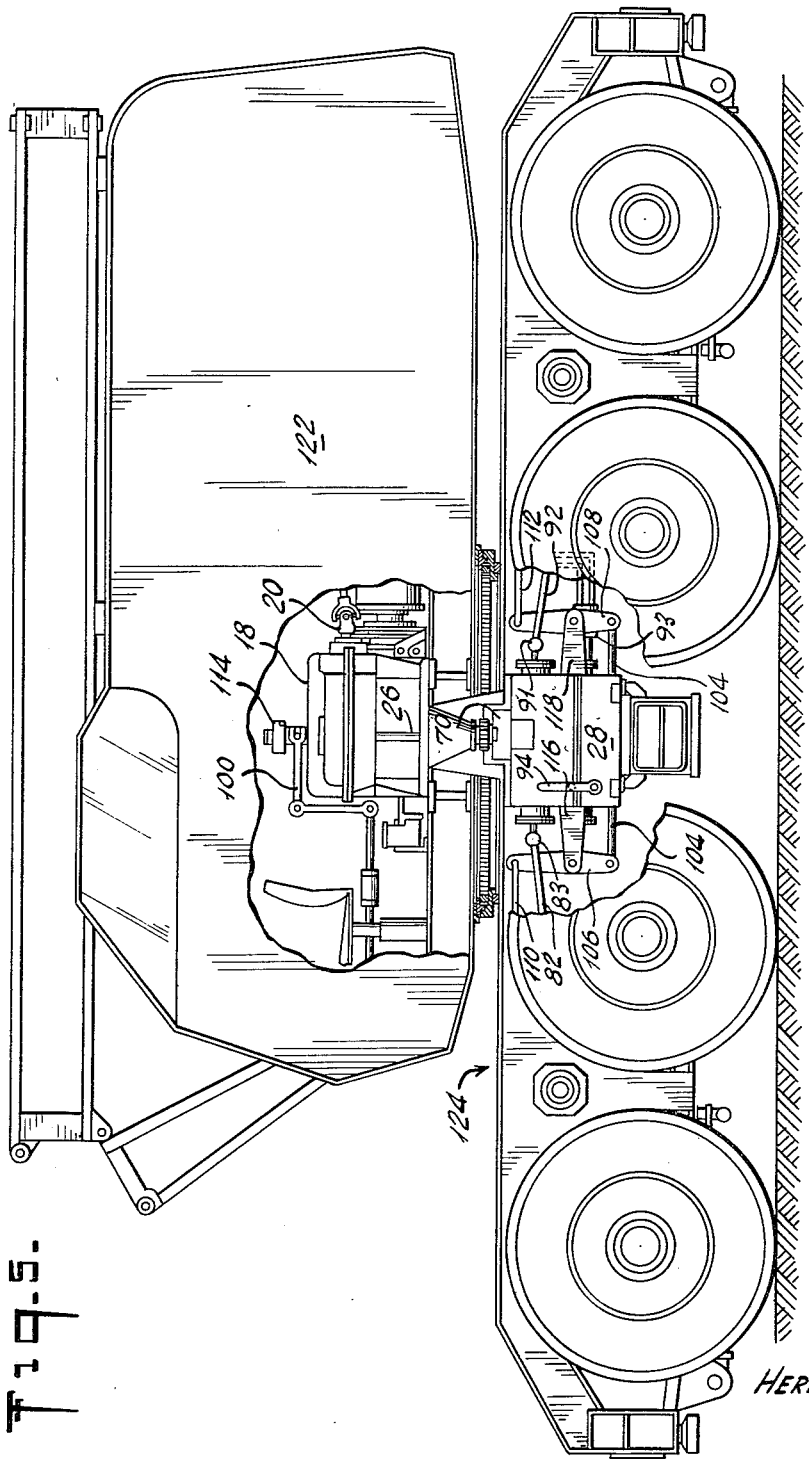

3,051,256
POWER DRIVE FOR FOUR AXLE VEHICLE
Herbert Brandt, Leipzig, Germany, assignor to VEB Getriebewerk Leipzig, Bohlitz-Ehrenberg, Germany
Filed Apr. 6, 1959, Ser. No. 804,326
6 Claims. (Cl. 180—24)

This invention relates in general to driving mechanisms for vehicles and in particular to a new and useful driving mechanism for a four-axle vehicle including separate differentially connected means for driving two of the axles alone and including means for driving all four axles simultaneously.

The present invention is particularly directed to a four-axle drive for vehicles such as an auto-crane or the like, having a rotatable cab centrally disposed between and above the four axles.

In the driving of such vehicles, the first and the last axles are usually driven from an open bevel gear arranged at the center of rotation of the cab and which is driven from the cab by two take-off half-shafts without differential compensation. Slipping clutches built into the power take-off are provided to prevent overload. For slow road travel, such clutches are effective but for rapid travel, because of the increased dirtying, high-speed running precision and lubrication compensating means. An overload slip clutch is also provided in burdening the axle drives with the friction value-dependent slipping moment after the build-up of the difference moment caused by the friction. When using a four-axle drive, twisting moments are produced on some of the axles when the clutches are engaged while the vehicle is motionless because there is no constant differential compensation. Since the outer and inner axles travel at different paths around the radius of a curve, such drives are imperfect, because no overload compensating gear is built in. The unbalance produced by the travelling of the axles along different radial distances introduces twisting moments which act on the axles and which are only compensated by the slipping of the wheels, and hence such drives have high tire wear and the driving mechanism is subject to excessive stress.

In accordance with the present invention, there is providing a centrally located housing including a closed, rigidly lockable, double differential coupling and distribution gear which permits continuous differential compensation in each of two drive axle sets. The arrangement permits driving through all four of the axles where the first and third, and the second and fourth axles are provided with separate differential compensating means. An overload slip clutch is also provided between the two sets of differentials in order to equalize the groups with each other.

In accordance with one feature of the present invention, each of the four axles of a vehicle, such as an auto-crane having a rotatable cab superstructure, is driven over a central gear from a rotatable shaft disposed within the rotation center of the cab and which is compensated and balanced in respect to the distribution of the twisting moment. The arrangement includes steering gear control means which is arranged symmetrically with the drive mechanism. The main transmission shaft surrounds the steering rod. The vertically arranged main drive take-off shaft is arranged to drive two laterally disposed sets of bevel gears, one of said sets being differentially connected to the first and third axles and the other set being differentially connected to the second and fourth axles. The arrangement includes means to disconnect one set of axles, such as the first and third, to permit continuous driving operation of the second and the fourth. Each of the two sets of axles is provided with differential compensation therebetween and the differentials are rigidly lockable.

An object of this invention is to provide a drive for a four-axle vehicle including differential compensation between each driven axle.

The various features of novelty which characterize the invention are pointed out with particularity in the claims annexed to and forming a part of the specification. For a better understanding of the invention, its operating advantages and specific advantages obtained by its use, reference should be had to the accompanying drawings and descriptive matter in which there is illustrated and described a preferred embodiment of the invention.

In the drawings:

FIG. 1 is a somewhat schematic top plan view, partly in section, of a four-wheel vehicle having an improved driving mechanism constructed in accordance with the invention;

FIG. 2 is a transverse vertical section taken on the line 2—2 of FIG. 1;

FIG. 3 is a vertical section taken on the line 3—3 of FIGS. 1 and 2;

FIG. 4 is a partial vertical section taken on lines 4—4 of FIGS. 1 and 2; and

FIG. 5 is a somewhat schematic overall view of the vehicle.

Referring to the drawings in particular, the invention as embodied therein includes a vehicle generally designated 120 (FIG. 5) and having four axle and wheel sets positioned on a chassis 124 in spaced relationship from front to rear and designated 10, 12, 14 and 16, respectively. In the present instance, the vehicle 120 is an auto-crane and includes a rotatable cab 122 centrally disposed between and above the axles 12 and 14.

The driving of the chassis occurs via an intermediate gear, which is disposed in the rotation center of the chassis. It comprises an upper housing 18 which is rotatably mounted within the cab 122 of the vehicle. Power is transmitted through a shaft 20 from a source (not shown) disposed within cab 122 by means of mating bevel gears 22 and 24 to a hollow, vertically supported shaft 26. The shaft 26 is supported within the housing 18 and a lower housing 28 which is supported on the chassis 124 (by means not shown). Within the housing 28, the shaft 26 is provided with a spiral gear 30 which is centrally disposed between and in engagement with two lateral spiral gears 32 and 34. The gear 32 is for the drive of the second and fourth axle and wheel sets 12 and 16, and the gear 34 is for the optional drive of the first and third axle and wheel sets 10 and 14.

The gear 32 is affixed to a shaft 35 which is rotatably mounted within the lower housing 28 and is provided with a bevel gear 36 at its lower end which meshes with a similar vertically disposed gear 38. The gear 38 drives a shaft 42 through a cog-wheel differential 40. Shaft 42 is horizontally disposed within the housing 28 and is provided with a gear 44 which meshes with a gear 46 to drive a shaft 48 over a universal joint 50. The shaft 48 is connected at its front end to a differential gear mechanism 52 to rotate the wheel and axle set 12.

The gear 32 (FIG. 2) also drives through the bevel gears 36, 38, with differential 40, a shaft 56 (FIG. 3) having a gear 58 affixed to the opposite end thereof. That gear rotates a gear 60 to transmit power through a universal joint 62 to a shaft 64 which drives through a differential gear mechanism 66 to operate the rear wheel and axle set 16 (FIG. 1). A hydraulic pump 93 is driven by shaft 56 (best seen in FIG. 4). This pump provides hydraulic pressure to actuate the slip or compensating clutch to be described hereunder.

The gear 34 is rotatable around on a shaft 68 which is journaled for rotation in a vertical position within the housing 28. A slip or compensating clutch 70 is provided to permit selectively driving either the wheel axles 12 and 16 alone or all of the wheel axles 10, 12, 14 and 16, as desired. The clutch 70 is actuated with pressure derived from pump 93 by control means not shown for either frictionally connecting or disconnecting the axles 10 and 14, and when the clutch is in frictional engagement it acts as a slip clutch for compensating for any unbalancing of the separate drive axle sets. The shaft 68 is provided with a bevel gear 72 which rotates a bevel gear 74 which in turn drives a shaft 78 through a differential 76, shaft 78 having a gear 77 at one end thereof. The gear 77 rotates a gear 80 affixed to a shaft 82 which drives over a universal joint 83 a differential gear mechanism 84 to rotate the wheel and axle set 10.

The gear 74 also drives a shaft 88 through the differential 76, this shaft having a gear 87 at its end, which rotates a gear 90 affixed to a differential shaft 92. The shaft 92 with universal joint 91 rotates the wheel and axle set 14 through a differential gear mechanism 95.

The slip or compensating clutch 70 comprises a plurality of clutch discs 73 rigid with the gear 34, interleaved with a second set of discs 75 carried by the shaft 68. Both gears 32 and 34 are driven by the central spiral gear 30. As described hereinabove, gear 32 drives the differential 40 and the wheel axles 12, 16.

The clutch 70 provides a disconnect facility, by control means not shown, between gear 34 and shaft 68, so that the differential 76 acting on wheel axles 10, 14 may be optionally disconnected. When the coupling 70 is in the engaged, frictional position, any slippage due to excessive overloading will be taken up between the axle pairs 12, 16 and 10, 14 by the relative movement of discs 73, 75.

Means are provided to lock each of the differentials 40 and 76, such means including differential catches 96 and 94, respectively.

A hollow steering column shaft 98 is rotatably mounted within the hollow shaft 26, and it is supported for rotation by the suitable bearings (not shown) in the lower housing 28. Steering is transmitted through a lever 100 to rotate the column 98 which moves a lever 102 connected with its depending arm 102a to a horizontal connecting rod 104. Through lever arms 106 and 108 at each end thereof, pivotable about respective brackets 116 and 118, the rod 104 transmits turning movement to rods 110 and 112 which are connected to the wheels for turning purposes. The hollow shaft 98 is provided with a cylindrical pot 114 with space for the passage of compressed air and electrical current connections through the hollow shaft to the chassis.

While a specific embodiment of the invention has been shown and described in detail to illustrate the application of the invention principles, it will be understood that the invention may be embodied otherwise without departing from such principles.

What is claimed is:
1. A four-axle vehicle including power means to drive said vehicle, a centrally located shaft connected to said power means for rotation thereby, a first differential driving gear means connected to said shaft for rotation thereby and connected to at least two of the axles, a second differential driving gear means connected to said shaft and to the remaining ones of the axles, and slip clutch means connected between said shaft and one of said differential driving gear means.

2. A four-axle vehicle including power means to drive said vehicle, a centrally located substantially vertically disposed shaft connected to said power means for rotation thereby, a first differential driving gear means connected to said shaft for rotation thereby and to the second and fourth axles of said vehicle, a second differential driving gear means connected to said shaft and to the first and third axles of said vehicle, and slip clutch means for optionally interconnecting said shaft and said second differential driving gear means, said slip clutch means permitting in its engaged condition slipping of said second differential driving gear means with respect to said first differential driving gear means under unbalanced force conditions, while releasing in its disengaged condition the driving of said first and third axles from said power means.

3. A four-axle vehicle according to claim 2, wherein said vertically disposed shaft is hollow, and wherein said vehicle includes a steering gear column within said shaft and means connecting said column with said axles to transmit steering motion to said axles.

4. A four-axle vehicle according to claim 3, including a pump connected to said first differential driving gear means for providing hydraulic pressure to actuate said slip clutch means.

5. A four-axle drive for a vehicle such as an auto crane having a rotatable housing symmetrically disposed in relation to the rotation center of said vehicle, a main shaft disposed in said housing and extending therebelow, substantially horizontally disposed first driving shaft for each of two of said axles, said first driving shafts extending from a location adjacent said main shaft to said two axles, first driving means connecting said main shaft with each of said first driving shafts, said first driving means including first differential means to effect compensation between said first driving shafts, substantially horizontally disposed second driving shafts for each of the remaining axles, said second driving shafts extending from a location adjacent said main shaft to said remaining axles, second driving means connecting said main shaft with each of said second driving shafts, said second driving means including second differential means to effect compensation between said second driving shafts, and slip clutch means for interconnecting said main shaft with one of said first and second driving means, permitting optional operation of said interconnected one of said driving means when said slip clutch means is engaged, whereby it acts as a compensating means for slippage in the event of unbalance between said first and second driving means.

6. A four-axle drive for a vehicle according to claim 5 wherein said first and second differential means include at least two separate differentials, and means to lock each of said differentials, so as to interconnect without differential compensation the respective pairs of said driven axles.

References Cited in the file of this patent
UNITED STATES PATENTS

| | | |
|---|---|---|
| 1,611,701 | Wilson | Dec. 21, 1926 |
| 1,815,839 | Ferguson | July 21, 1931 |
| 2,354,300 | Bock | July 25, 1944 |
| 2,693,719 | Johnson | Nov. 9, 1954 |
| 2,906,358 | Tucker | Sept. 29, 1959 |

FOREIGN PATENTS

| | | |
|---|---|---|
| 73,219 | Norway | Dec. 27, 1949 |